Patented Jan. 5, 1937

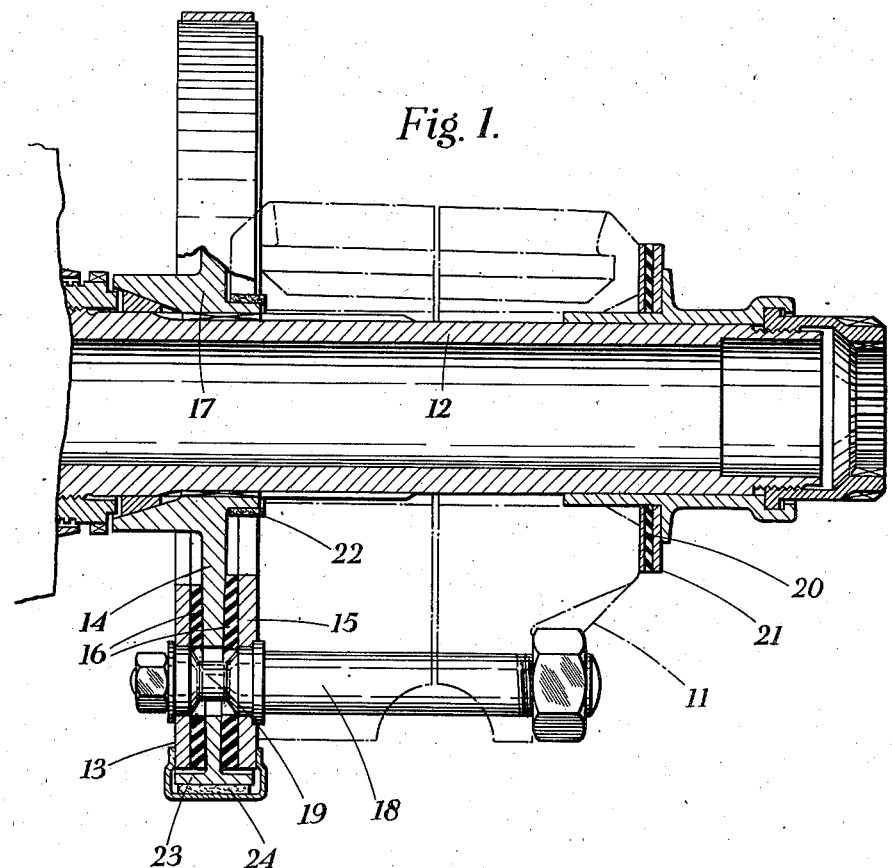
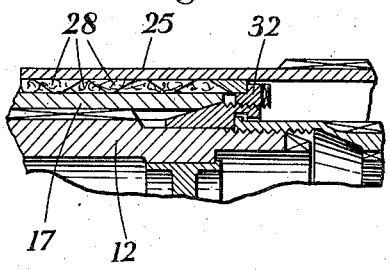

2,067,109

UNITED STATES PATENT OFFICE 2,067,109

ELASTIC COUPLING BETWEEN AN AIR SCREW HUB AND A CO-AXIAL DRIVING SHAFT

Spirito Mario Viale and Hamilton Neil Wylie, Coventry, England, assignors to Armstrong Siddeley Motors Limited, Coventry, England, a British company Application January 10, 1936, Serial No. 58,590
In Great Britain June 7, 1934

6 Claims. (Cl. 170—177)

This application has been filed in Great Britain on June 7, 1934.

This invention relates to elastic couplings to transmit torque between a driving shaft member and an air-screw hub member co-axial therewith.

According to the invention, the coupling between the two members, i. e., between the driving shaft and the air-screw hub, includes at least three longitudinally-spaced co-axial plates with interposed discs of rubber vulcanized or cemented to the surfaces of the intermediate plate and of the two outside plates respectively, the latter plates being secured to one another for movement in unison, and being connected to one of the said members whilst the intermediate plate is connected to the other.

Various arrangements according to the invention are illustrated in the accompanying diagrammatic drawings, in which, Figure 1 is a part-sectional elevation through a coupling between the crankshaft of an internal-combustion engine and the hub, indicated by chain lines, of an air-screw;

Figures 3 to 4 are fragmentary sectional views indicating further arrangements.

Like numerals are used as far as possible to denote similar parts throughout the different figures.

Figure 2:
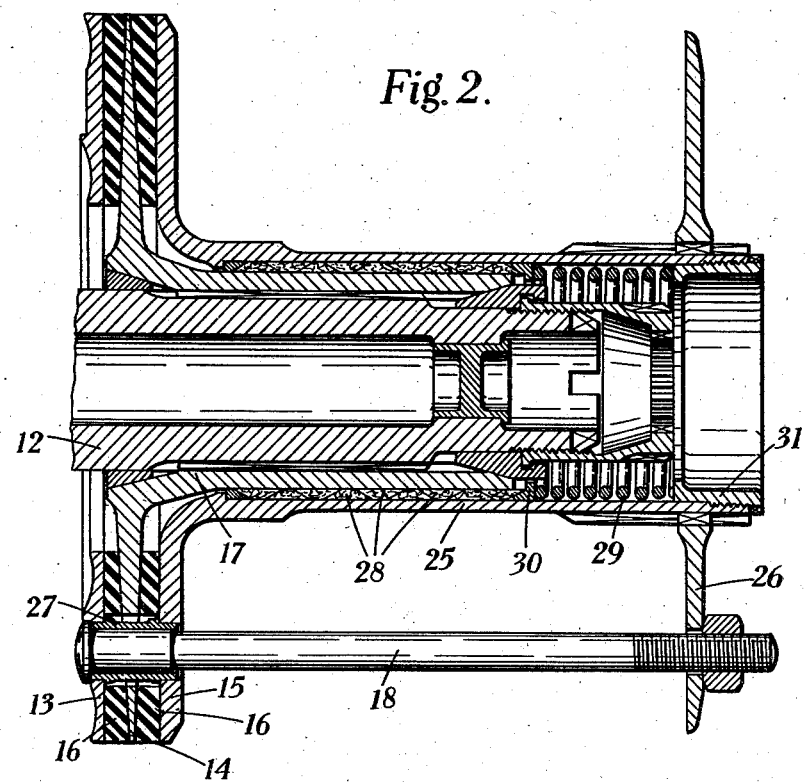
Figure 2 is a longitudinal section of an alternative arrangement.

In the construction of Figure 1, for coupling an air-screw hub 11 to the engine shaft 12, the coupling consists of three rigid co-axial plates 13, 14, 15 with a disc 16 of rubber between each adjacent pair of plates, each disc being vulcanized or cemented thereto. Conveniently the intermediate plate 14 is the driving one, being in this case integral with a sleeve 17 fast on the shaft 12, the two outside ones 13, 15 being the driven plates. They may be connected to the air-screw hub by longitudinally-extending studs 18 of large diameter fixed in the hub and fitting in holes in the outside plates, the studs being "necked down" at 19 to a smaller diameter than that of similar holes in the intermediate plate 14 and in the rubber discs so as to allow for relative movement between the intermediate and the other plates. These studs may serve to apply compression to the rubber discs as is actually illustrated, so that a disc will still be subjected to shear in the event of the binding between the disc and a rigid plate being defective over any small area by the friction between the disc and the plates.

The rubber discs 16 are shown tapered in a radial direction, the thickness of any portion being substantially proportional to the distance of that portion from the main axis.

The thrust of the air-screw is in this instance resisted by a thrust washer 20. This latter, if of rubber, should be prevented from spreading by being fixed to a plate 21 of rigid material. Alternatively, the thrust washer may be of friction material of a character to act as a friction damper.

The hub of the air-screw is accurately centred on its shaft by bushes which may be of metal but are preferably of fibre, bakelite or the like— since metal to metal contact is unsatisfactory under rapidly fluctuating movement of small amplitudes. 22 indicates one such bush.

When the rubber discs are subjected to compression by the rigid plates being clamped together by the above-mentioned studs, the rubber tends to bulge at the edges, and it is important that the rubber should not bulge. It should for preference be recessed within the edges of the rigid plates. This is readily accomplished by over-compressing the rubber by clamping the plates together with excess of pressure and then removing the rubber which bulges out. Alternatively the rubber may be recessed in the process of moulding, but this is not usually convenient.

The intermediate plate 14 may have a cylindrical portion 23 at its periphery overlying the peripheries of the two driven plates and adapted to co-operate with an external-contracting brake, indicated at 24, carried by the driven part and acting as a friction damper in respect of torque fluctuation.

In the modification shown by Figure 2, one of the outside plates 15 is formed with a sleeve portion 25 surrounding the sleeve portion 17 of the driving plate, and the ends of the bolts 18 are supported in the plate 26 slidingly splined on the sleeve portion 25. In this case the bolts are mounted in spacers 27 which extend through the rubber discs 16 and the intermediate plate 14 with clearance and serve to limit the extent to which the rubber discs can be compressed.

In this arrangement torque fluctuations are damped by means of a series of oppositely-arranged conical washers, 28, 28 interposed between the sleeves 17 and 25. These washers are urged into frictional contact with one another and with the adjacent surfaces of the sleeves by means of the spring 29 acting between the slidable collar 30 and the nut 31 carried by the sleeve portion 25. Thus the frictional damping between the driving and driven members can be set for any predetermined value.

Figure 3 indicates an alternative method of applying frictional damping so that it will vary with the thrust of the air-screw, as is desirable. In this case the conical washers 28 are held in engagement with the surfaces of the two sleeves by means of the nut 32 carried by the end of the crankshaft 12. Thus the axial thrust exerted by the air-screw, tending to move the driven sleeve 25 to the right (Figure 3), will increase the frictional engagement of these washers with the two sleeves.

Figure 4:
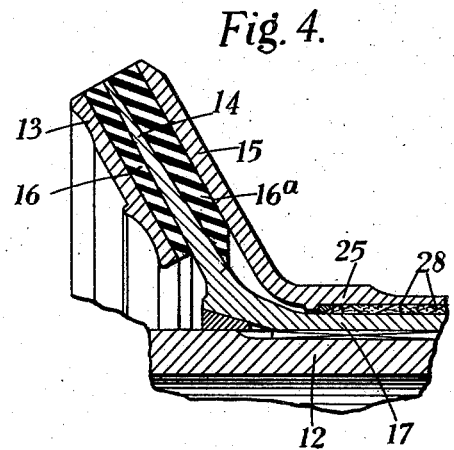

Figure 4 indicates the application of the invention where the intermediate plate 14 and the outer plates 13, 15 are all of dished or conical form. The outer plates are rigidly coupled to one another in the manner previously described.

We claim:—

1. A means for coupling an air screw hub member to a drive shaft comprising at least three longitudinally-spaced co-axial plates, rubber discs adhesively secured between the adjacent surfaces of said plates, and bolts connecting the outside plates to one another for movement in unison and connecting them also to said hub, said bolts passing through clearance holes in said rubber discs and in the intermediate plate, and means for securing said intermediate plate to the shaft against movement relative to the said driving shaft.

2. A means for coupling an air screw hub member to a drive shaft comprising three longitudinally-spaced co-axial plates, rubber discs adhesively secured between the adjacent surfaces of said plates, and bolts securing the outside plates to one another for movement in unison and connecting them to said air-screw hub, said bolts serving also for compressing the rubber discs, and said bolts passing through clearance holes in the intermediate plate, and means for fixedly securing the intermediate plate to said driving shaft.

3. A means for coupling an air screw to a drive shaft comprising a sleeve fixed to the shaft, a plate integral with the sleeve, a pair of plates disposed one on each side of said first plate, cushioning members between the confronting faces of said first plate and said pair of plates, one of said pair of plates engaging against one side of the hub of an air screw, another plate engaging against the other side of the hub, and hub securing bolts engaging through said first plate and said pair of plates, said bolts and said first plate having means so constructed and arranged that said hub and said pair of plates may have limited movement relative to said first plate.

4. A means for coupling an air screw to a drive shaft comprising a sleeve fixed to the shaft, a plate integral with the inner end of the sleeve, a second sleeve telescoping said first sleeve, a plate integral with the inner end of said second sleeve and disposed in confronting relation to said first plate, a cushioning member interposed between said plates, a third plate splined onto the outer portion of said second sleeve, said second and third plates being engageable on opposite sides of an air screw hub mounted on said second sleeve, and bolts passing through all of said plates and said cushioning means, said first plate having bolt openings of such a size that said second and third plates and said second sleeve may have limited movement relative to said first plate.

5. A means for coupling an air screw to a drive shaft comprising a sleeve fixed to the shaft, a plate integral with the inner end of the sleeve, a second sleeve telescoping said first sleeve, a cushioning sleeve between said first and second sleeves, a plate integral with the inner end of said second sleeve and disposed in confronting relation to said first plate, a cushioning member interposed between said plates, a third plate carried by the outer portion of said second sleeve, said second and third plates being engageable on opposite sides of an air screw hub mounted on said second sleeve, and bolts passing through all of said plates and said cushioning member, said first plate having bolt openings of such a size that said second and third plates and said second sleeve may have limited movement relative to said first plate.

6. A means for coupling an air screw to a drive shaft comprising a sleeve fixed to the shaft, a plate integral with the inner end of the sleeve, a second sleeve loosely engaging about said first sleeve, a cushioning sleeve between said first and second sleeves, tensionable means carried by said second sleeve and engaging said cushioning sleeve, a plate integral with the inner end of said second sleeve and disposed in confronting relation to said first plate, a cushioning member interposed between said plates, a third plate movably mounted on said second sleeve adjacent the outer end thereof, said second and third plates being engageable on opposite sides of an air screw hub mounted on said second sleeve, and bolts passing through all of said plates and said cushioning member, said first plate having bolt openings of such a size that said second and third plates and said second sleeve may have limited movement relative to said first plate.

SPIRITO MARIO VIALE.
HAMILTON NEIL WYLIE.